(12) United States Patent
Kinarti et al.

(10) Patent No.: US 11,616,832 B2
(45) Date of Patent: *Mar. 28, 2023

(54) DATA ROUTING IN PEER-TO-PEER NETWORKS

(71) Applicant: SAP Portals Israel Ltd., Ra'Anana (IL)

(72) Inventors: Barak Kinarti, Kfar Saba (IL); Ido Fishier, Tel Aviv (IL); Eyal Nathan, Reut (IL); Amir Blich, Ra'Anana (IL); Marcus Conrad Behrens, Heidelberg (DE)

(73) Assignee: SAP Portals Israel Ltd., Ra'Anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/843,009

(22) Filed: Jun. 17, 2022

(65) Prior Publication Data

US 2022/0321646 A1 Oct. 6, 2022

Related U.S. Application Data

(63) Continuation of application No. 15/398,129, filed on Jan. 4, 2017, now Pat. No. 11,405,452.

(51) Int. Cl.
| | | |
|---|---|---|
| *G06F 15/16* | (2006.01) | |
| *H04L 67/104* | (2022.01) | |
| *H04L 67/12* | (2022.01) | |
| *H04L 43/0876* | (2022.01) | |
| *H04L 67/1034* | (2022.01) | |
| *H04L 67/1008* | (2022.01) | |
| *H04L 69/40* | (2022.01) | |
| *H04L 41/5025* | (2022.01) | |

(52) U.S. Cl.
CPC ........ *H04L 67/104* (2013.01); *H04L 41/5025* (2013.01); *H04L 43/0876* (2013.01); *H04L 67/1008* (2013.01); *H04L 67/1034* (2013.01); *H04L 67/12* (2013.01); *H04L 69/40* (2013.01)

(58) Field of Classification Search
CPC ............... H04L 67/104; H04L 41/5025; H04L 43/0876; H04L 67/12
USPC ........................................................ 709/224
See application file for complete search history.

(56) References Cited

U.S. PATENT DOCUMENTS

2007/0130283 A1* 6/2007 Klein ...................... H04L 67/63
709/217
2012/0278386 A1* 11/2012 Losacco .............. H04L 67/1078
709/204

(Continued)

OTHER PUBLICATIONS

"U.S. Appl. No. 15/398,129, Appeal Brief filed May 12, 2020", 15 pgs.

(Continued)

*Primary Examiner* — Suraj M Joshi
*Assistant Examiner* — Joel Mesa
(74) *Attorney, Agent, or Firm* — Schwegman Lundberg & Woessner, P.A.

(57) ABSTRACT

System and methods for enforcing service level agreements (SLAs) between computing platforms engaged in (e.g., Internet-of-Things) data exchange via peer-to-peer (P2P) connections are described. In accordance with various embodiments, data traffic via the P2P connections is monitored, and if an SLA violation is detected, data streams are rerouted to cure the violation.

20 Claims, 6 Drawing Sheets

(56) References Cited

U.S. PATENT DOCUMENTS

| | | | | |
|---|---|---|---|---|
| 2013/0346587 A1* | 12/2013 | Barkett | .................. | G06Q 50/01 |
| | | | | 709/224 |
| 2017/0104651 A1* | 4/2017 | Kakadia | .................. | H04L 43/04 |
| 2017/0287090 A1* | 10/2017 | Hunn | ..................... | G06Q 50/18 |
| 2018/0191814 A1 | 7/2018 | Kinarti et al. | | |

OTHER PUBLICATIONS

"U.S. Appl. No. 15/398,129, Appeal Decision mailed Mar. 2, 2022", 9 pgs.

"U.S. Appl. No. 15/398,129, Decision on Pre-Appeal Brief Request mailed Apr. 20, 2020", 2 pgs.

"U.S. Appl. No. 15/398,129, Examiner Interview Summary dated Oct. 22, 2019", 3 pgs.

"U.S. Appl. No. 15/398,129, Examiner's Answer dated Sep. 28, 2020", 8 pgs.

"U.S. Appl. No. 15/398,129, Final Office Action dated Sep. 19, 2019", 11 pgs.

"U.S. Appl. No. 15/398,129, Non Final Office Action dated Mar. 22, 2019", 13 pgs.

"U.S. Appl. No. 15/398,129, Non Final Office Action dated Dec. 31, 2019", 13 pgs.

"U.S. Appl. No. 15/398,129, Notice of Allowance dated Apr. 14, 2022", 6 pgs.

"U.S. Appl. No. 15/398,129, Pre-Appeal Brief Request filed Mar. 13, 2020", 4 pgs.

"U.S. Appl. No. 15/398,129, Reply Brief filed Oct. 16, 2020".

"U.S. Appl. No. 15/398,129, Response filed Oct. 30, 2019 to Final Office Action dated Sep. 19, 2019", 11 pgs.

"U.S. Appl. No. 15/398,129, Response filed Jun. 11, 2019 to Non-Final Office Action dated Mar. 22, 2019", 11 pgs.

\* cited by examiner

DATA ROUTING IN PEER-TO-PEER NETWORKS

CROSS-REFERENCE TO RELATED APPLICATIONS

This application is a continuation of prior U.S. application Ser. No. 15/398,129, filed on Jan. 4, 2017, which is incorporated by reference herein in its entirety.

FIELD

The present disclosure relates generally to data routing in peer-to-peer (P2P) networks. Various embodiments pertain, more particularly, to data sharing in business-to-business (B2B) P2P networks subject to service-level agreements (SLAs).

BACKGROUND

The Internet of Things (IoT) generates vast amounts of data that are often useful not only to the organization owning or operating the IoT devices generating the data, but also to other organizations. For example, electricity usage as measured by one utility company may be of interest to other utility companies and power plants, e.g., for the prediction of loads, or to security companies, e.g., for the detection of suspicious activity. Accordingly, there may be incentives for sharing data between IoT networks acting as data producers and/or data consumers, respectively. Data acquired by one IoT network may, for instance, be streamed to others for an agreed-upon price. Data sharing can be facilitated via P2P networks, and may be subject to SLAs, that is, to contractual arrangements defining minimum levels of data availability and currency, or related metrics (e.g., maximum acceptable data loss or delays, minimum data rates, mean time to recovery in case of interruptions of data transfer, etc.). Means for enforcing such SLAs have, however, been lacking to date.

BRIEF DESCRIPTION OF THE DRAWINGS

The present disclosure is illustrated by way of example and not limitation in the accompanying drawings.

DETAILED DESCRIPTION

Figure 1:
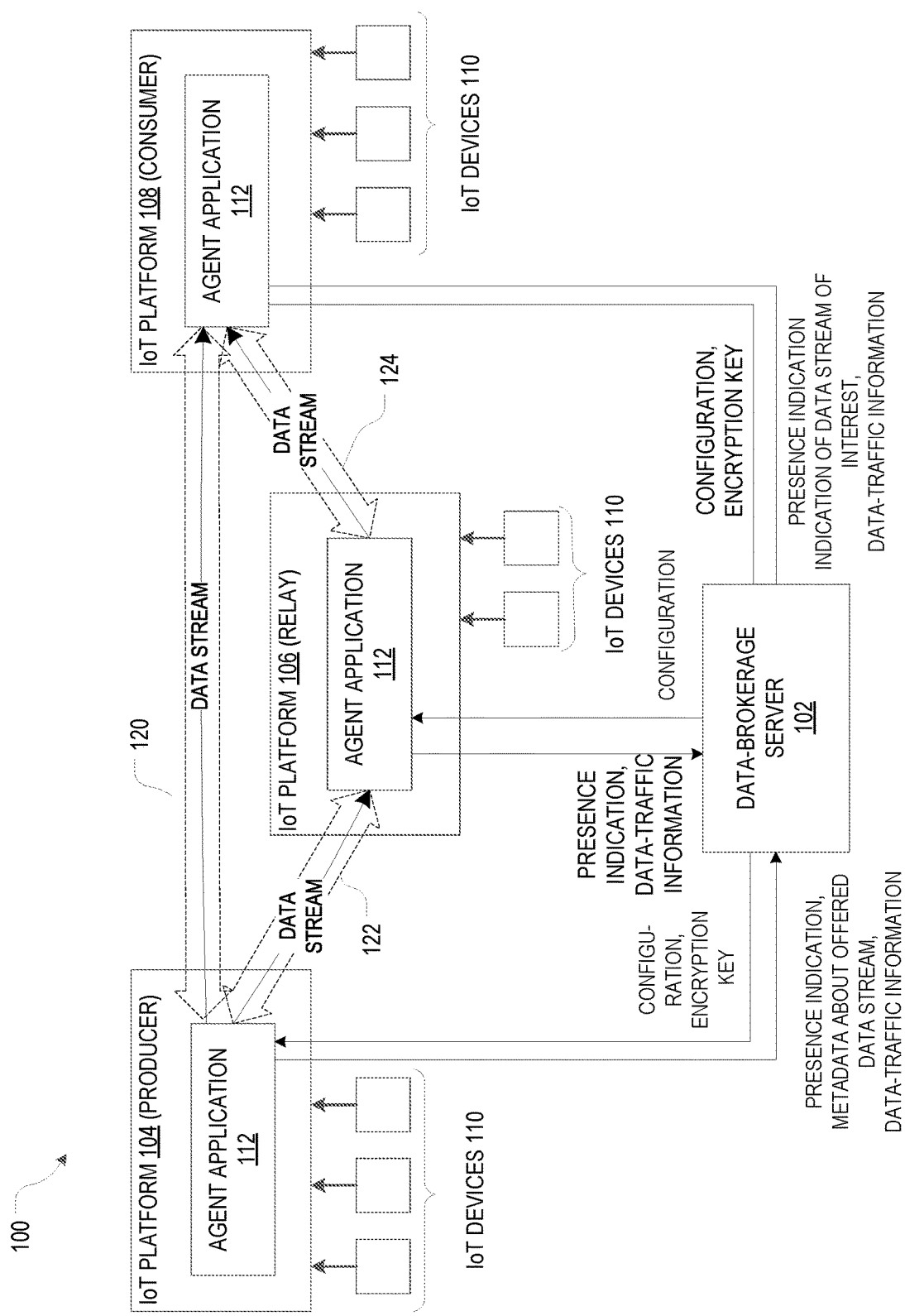
FIG. 1 is a block diagram of an example system for data sharing between data producers and data consumers pursuant to SLAs, in accordance with various embodiments.

Described herein are methods, system, devices, and computer-program products embodied in machine-readable storage media for enforcing SLAs in P2P networks. Various embodiments relate, in particular, to P2P networks of computing platforms acting as senders and/or recipients of IoT data (hereinafter also referred to as "data producer" and "data consumer," respectively). It is to be understood that an IoT computing platform (herein also, for brevity, "IoT platform") can generally act, at any point in time, as producer and/or consumer of IoT; often, an IoT platform assumes both roles simultaneously with respect to different data streams. Moreover, in accordance with some embodiments, IoT platforms may serve as relays of IoT data streams, e.g., to allow other IoT platforms to meet their obligations under an SLA.

In accordance with various embodiments, data sharing between IoT computing platforms is facilitated by a data brokerage server connected to the IoT computing platforms. The data-brokerage server may receive metadata about data streams made available by the data producers and information about data needs of the data consumers, and pair consumers with producers that match their needs. Based on the identified pairings, peer-to-peer (P2P) connections may be established between data producers and data consumers to enable producer-to-consumer data streaming, often in real time. Accordingly, the data-brokerage server assists with initiating the connections between data producers and data consumers, but is disintermediated once the connections are established (except for the monitoring and enforcement of SLAs as described below), in contrast to traditional data-sharing systems where data is centrally stored for retrieval by the consumers. Beneficially, avoiding such centralized storage in accordance with P2P embodiments as described herein renders the system inherently more scalable, as new participants in the data-sharing service bring along additional storage, processing capacity, and bandwidth.

In various embodiments, the data-brokerage server further stores, monitors, and enforces SLAs entered into by data consumers and data producers as part of the data-sharing arrangement. SLA monitoring may involve comparing real-time data-traffic information received from the individual IoT platforms regarding their P2P connections against the applicable SLAs, and routing data to ensure, if possible, that agreed-upon service levels are met. In instances where a data producer does not have sufficient capacity to service all data consumers that have subscribed to its data stream directly, the data-brokerage server may identify one or more IoT platforms with excess capacity that can serve as transmission stations, or "relays," for the data stream. The IoT platform acting as a relay may itself be a consumer of the data stream, and may reduce the data producer's load by forwarding the data stream on to another consumer. The relaying IoT platform may be compensated for the use of its resources on behalf of the data producer, e.g., with a discount on the price it pays for the data stream. It is also possible that an IoT platform acts as relay for a data stream that it has not subscribed to itself. In this case, the relay platform may be added to the existing sub-network of IoT platforms associated with the data stream. To limit data access to the actual subscribers (and avoid giving the relay platform access to information it does not pay for), the data stream may be encrypted, and decryption keys given only to the subscribing data consumers and not to the IoT platform acting purely as relay. While IoT platforms acting in a pure relay capacity cannot get the benefit of a discount from the data producer (at least with respect to the data stream they are merely distributing on behalf of the producer), they may agree to serve as relays in exchange for being able to participate in the data-sharing service, or may be compensated in other ways. For example, a data producer benefiting from the use of another IoT platform's resources may be obligated to pay the data-stream relaying platform(s) directly, or the data-brokerage server may pool fees received from data producers (e.g., for managing their SLAs generally, or for rerouting data in cases of insufficient capacity specifically) and remit payments to any IoT platforms it calls upon to serve as data-stream relays.

While the monitoring and enforcement of SLAs in P2P networks is herein described with respect to networks employed to share IoT data, it will be appreciated by those of ordinary skill in the art that many of the underlying principles and described features are equally applicable to other types of data and P2P networks. Embodiments may be used, for example, for transactional data from business systems, video streams, and files.

The foregoing will be more readily understood from the following description of various example embodiments, in particular when taken in conjunction with the accompanying drawings.

Figure 6:
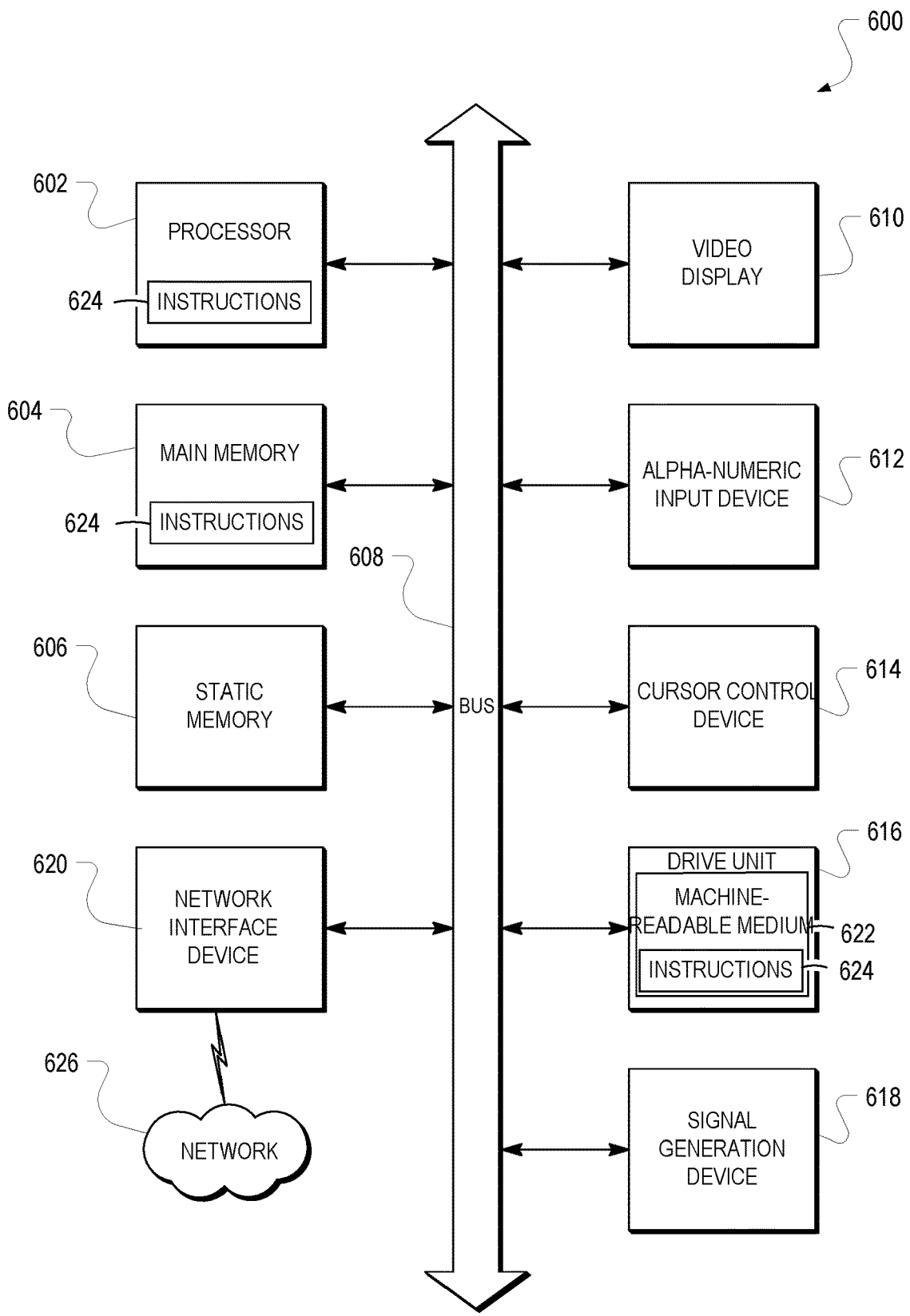
FIG. 6 is a block diagram of a computer processing system within which a set of instructions may be executed for causing a computer to perform any one or more of the methodologies discussed herein.

FIG. 1 is a block diagram of a system 100 for sharing data between data producers and data consumers as brokered by a data-brokerage server 102, in accordance with various embodiments. The system 100 includes a plurality of IoT platforms (e.g., platforms 104, 106, 108), each of which may be connected to one or more IoT devices 110 generating data. Examples of IoT devices 110 include, without limitation, stationary or mobile computing devices (e.g., personal computers, laptops, smartphones, tablets, wearable computing devices), audio and video devices (e.g., televisions, cameras, gaming platforms), environmental sensors and monitoring devices (e.g., temperature sensors, pressure sensors, flow sensors, seismic sensors, etc., and related warning systems), biomedical sensors and monitoring devices (e.g., blood pressure and heart rate monitors), as well as sensors and controllers in vehicles, automated manufacturing systems, building or home automation systems, security systems, transportation systems, energy-management systems, etc. Each of the IoT platforms 104, 106, 108 runs an agent application 112 (which may have been downladed from the data-brokerage server 102 upon registration) that operates in conjunction with the data-brokerage server 102, facilitating data exchange with other IoT platforms as brokered by the data-brokerage server 102. The data-brokerage server 102 as well as the IoT platforms 104, 106, 108 may generally each be implemented by a single computing machine (e.g., a computer as illustrated in FIG. 6) or by multiple machines intercommunicating via a suitable network.

In the example depicted in FIG. 1, the system 100 includes three IoT platforms 104, 106, 108, acting as data producer, relay, and data consumer, respectively. It is to be understood, however, that the system 100 may generally include any number of IoT platforms, and that each individual IoT platform (e.g., 104, 106, 108) may generally act as data producer and/or data consumer (e.g., serving in both capacities at different times or even simultaneously with respect to different data streams) and further as a relay (of data streams with respect to which it may or may not also act as data consumer). Accordingly, the agent applications 112 may include the functionalities for both data producers and data consumers as well as relays (see also FIG. 3 below), and the IoT platforms, depending on their momentary operation in one or another, may utilize different subsets of the functionalities. In some embodiments, the various IoT platforms execute different instances of the same agent application 112.

To participate in data sharing, the IoT platforms indicate their presence to the data-brokerage server 102. Further, for an IoT platform acting as data producer (e.g., as depicted, IoT platform 104), the agent application 112 transmits metadata about the data streams the IoT platform offers (e.g., for purchase or for free) to the data-brokerage server 102. That metadata may include, e.g., the types of data and associated units, data rates, information about the IoT devices 110 collecting the data (such as, e.g., their locations, manufacturers, model and serial numbers, measurement accuracies), and any relevant pricing information if the data is available for purchase. Similarly, for an IoT platform acting as data consumer (e.g., as depicted, IoT platform 108), the agent application 112 transmits information about the data streams of interest, such as the types of data and the (geographically or otherwise defined) locations where the data is to be collected. Based on the information received from the data producer(s) and data consumer(s), the data-brokerage server 102 can identify data streams matching a given data consumer's interests. Upon selection, by a data consumer, of the data stream(s) to which it wishes to subscribe, the data-brokerage server 102 may exchange communications with the data consumer and each of the data producers to establish a contract between data producer and data consumer directly and/or with the data-brokerage service provided by the server 102. The contract may include pricing and payment terms (such as, e.g., a price to be paid by the data consumer to the data producer, directly or via the data-brokerage service, and any commission to be paid to the data-brokerage service), as well as any SLA terms.

To cause a given pair of data consumer and data producer (e.g., as shown, IoT platforms 104, 108) to connect and begin data transfer, the data-brokerage server 102 may send configuration information and, as part of the configuration information or separately, the network address of the respective other IoT platform. The configuration information may, for instance, specify data rates as provided in the SLA, or formatting applied to the data stream producer-side prior to transmission or consumer-side upon receipt. The configuration may be split into general metadata describing the data stream characteristics (such as available fields, update intervals, etc.) and a link configuration containing information about the specific provider-consumer data exchange for a specific data stream. To ensure the security and privacy of the data stream, the data-brokerage server 102 may also generate and send encryption keys or similar security tokens to the data-producer and data-consumer platforms 104, 108. Using the network addresses (and, optionally, security tokens), the agent applications 112 executing on the data-consumer and data-producer IoT platforms 104, 108 can then establish a (secure) P2P connection 120 between them. Depending on the preferences and external-access policies of the data-producer IoT platform 104 and data-consumer IoT platform 108, the P2P connection 120 can be initiated by either one or both of them. For example, if only one of the two IoT platforms 104, 108 allows external access from the Internet, the other IoT platform will initiate communications. If both allow external access, the initialization of communications may default to the data consumer, in some embodiments. If neither of the IoT platforms 104, 108 allows external access, both may initiate communications with a proxy node. In some embodiments, security tokens are set to expire after a certain time period, and updated security tokens are sent periodically to the data-consumer IoT platform 108 and the data-producer IoT platform 104 to reestablish the connection.

Once a P2P connection 120 is established between a data-producer IoT platform 104 and a data-consumer IoT platform 108, transfer of the data stream from the data-producer IoT platform 104 to the data-consumer IoT platform 108 begins. In accordance with embodiments of the disclosed subject matter, for the purpose of enforcing SLA terms, the data-producer 104 IoT platform and/or the data-consumer IoT platform 108 monitor the data traffic associated with the data stream, and send data-traffic information to the data-brokerage server 102. Based on the data-traffic information, generally aggregated over multiple P2P connections 120 maintained by a given data-producer IoT platform as well as gathered for multiple IoT platforms, the data-brokerage server 102 can measure the loads (e.g., bandwidth usage) and free capacity (e.g., free bandwidth) of IoT platforms, determine whether SLAs are met, and (re-) route data to enable data producers to meet their SLA obligations and/or, more generally, to balance loads and optimize data transfer rates and similar metrics.

In some situations, illustrated and explained with reference to FIG. 2 below, it may be beneficial, instead of routing data from the data-producer platform 104 directly to the data-consumer platform 108 (via P2P connection 120), to relay the data stream instead via a third, intermediate IoT platform 106. This intermediate (or "relay") IoT platform 106 may be identified, by the data-brokerage server 102, based on an indication of its presence in conjunction with data-traffic information indicating free capacity. To reroute the data stream, the data-brokerage server 102 may send updated configuration information to the data-producer and data-consumer IoT platforms 104, 108 as well as to the relay IoT platform 106, causing new P2P connections 122, 124 to be established between the data-producer IoT platform 104 and the relay IoT platform 106 and between the relay IoT platform 106 and the data-consumer IoT platform 108, in lieu of the direct P2P connection 120. For encrypted data streams, the encryption keys are still provided to the data-producer and data-consumer IoT platforms 104, 108, and not to the relay IoT platform 106, unless the latter is itself a data consumer with respect to the data stream it relays.

Figure 2A:
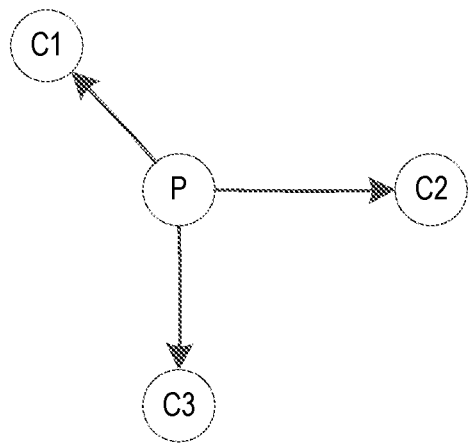
FIGS. 2A-2C are network diagrams illustrating three example data-routing scenarios in accordance with various embodiments.
Figure 2B:
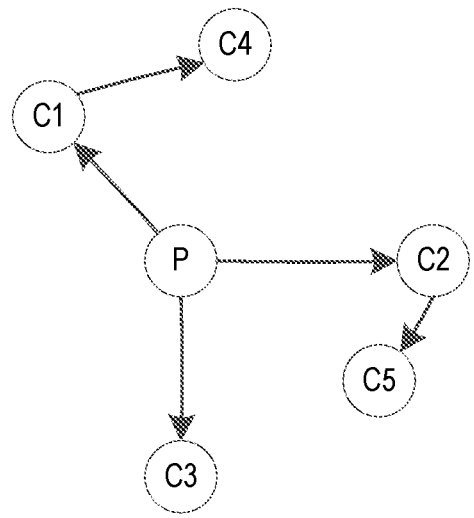
Figure 2C:
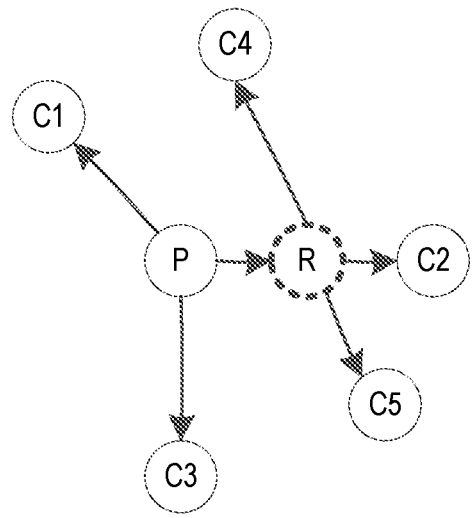

FIGS. 2A-2C are network diagrams illustrating three example data-routing scenarios in accordance with various embodiments. Each diagram shows a subset of the IoT platforms within a larger IoT-data-sharing network, the subset forming a sub-network associated with a single data stream. In FIG. 2A, the sub-network includes a data producer (labeled "P") sending the data stream (indicated by arrows) directly to three data consumers (labeled "C1," "C2," and "C3"). Assume that these three data consumers C1, C2, C3 exhaust the bandwidth of the data producer P, such that further data consumers cannot be serviced without a reduction in service levels to the first three data consumers. In order to nonetheless give additional data consumer C4 and C5 access to the data stream, some of the data consumers may be configured to also relay the received data stream to other data consumers. For example, as shown in FIG. 2B, data consumer C1 is configured to double as a relay, transmitting the data stream to data consumer C4, and data consumer C2 is similarly configured to relay the data stream to data consumer C5. Assume now that none of the data consumers in the sub-network of FIG. 2A has sufficient free bandwidth to transmit data to additional data consumers. In this case, the existing sub-network may be expanded by adding an additional peer IoT platform (labeled "R") that serves merely as a relay, without itself being a data consumer. The relay R may be selected from among the larger data-sharing network (e.g., it may be a data producer or data consumer of another data stream), or may even be a newly deployed computing platform deployed by the data-brokerage server as a "virtual node" purely for the purpose of transmitting data streams.

Figure 3:
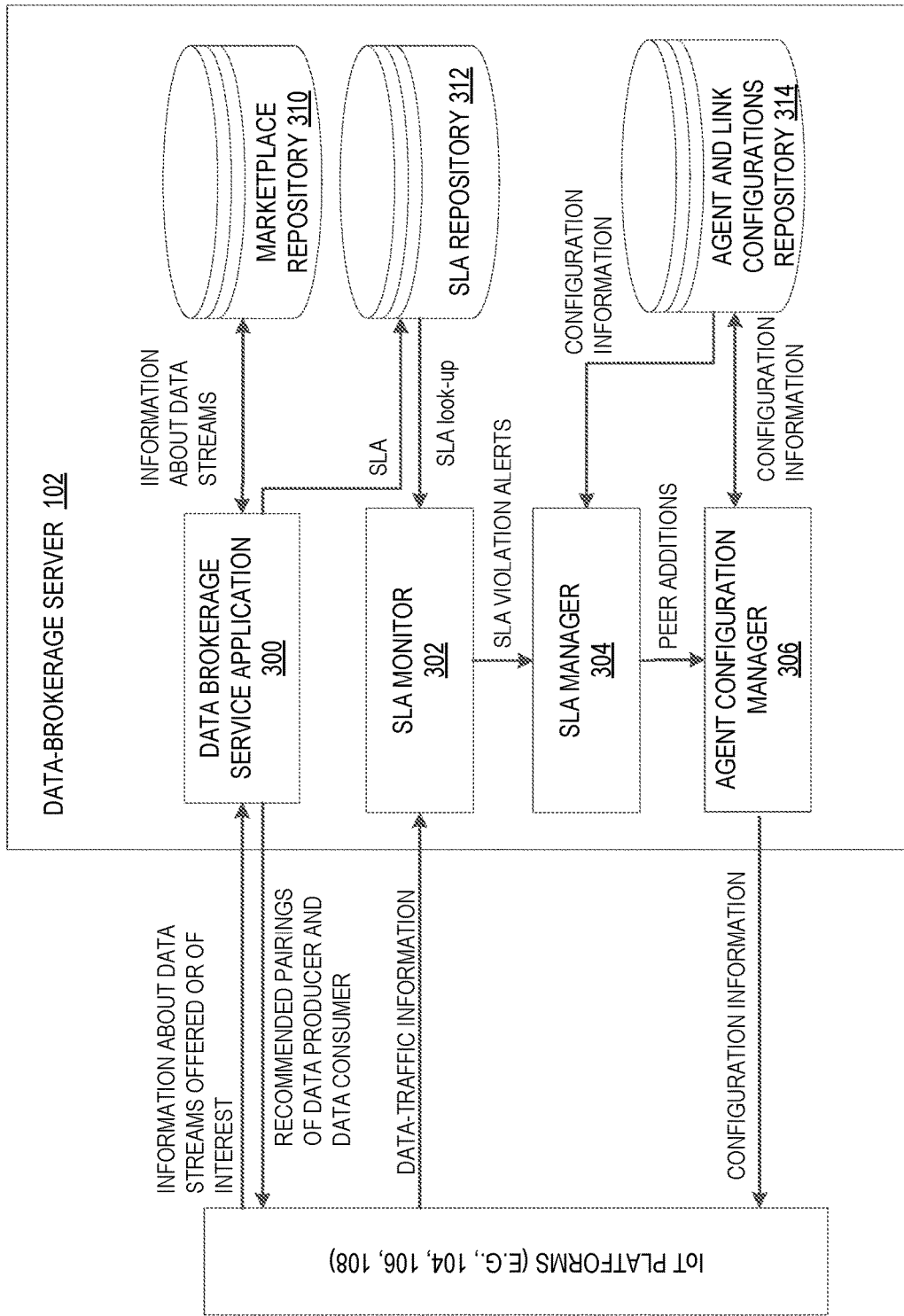
FIG. 3 is a block diagram of a data-brokerage server in accordance with an example embodiment.

FIG. 3 is a block diagram illustrating, in more detail, a data-brokerage server 102 in accordance with an example embodiment. The data-brokerage server 102 includes a number of computational modules, such as a data-brokerage service application 300, an SLA monitor 302, an SLA manager 304, and an agent-configuration manager 306. These modules are implemented by a suitable combination of hardware and/or software, such as by one or more computer processors executing program code stored in memory. The data-brokerage server 102 further stores various data repositories, including a marketplace repository 310 containing metadata about data streams provided by data producers and, optionally, about data streams of interest to data consumers, an SLA repository 312 storing the SLAs associated with data sharing arrangements between producers and consumers, and an agent and link configurations repository 314 holding information about the configuration of the data-sharing network and the connections between the IoT platforms therein as well as configurations of the agent applications 112 running on the individual IoT platforms. These data repositories 310-314 are usually implemented in permanent data storage devices, and may be organized, e.g., as databases, hashes, or file repositories. The data-brokerage server 102 also includes a network interface (or multiple such interfaces on multiple computers collectively constituting the data-brokerage server 102) for communicating with the IoT platforms (e.g., IoT platforms 104, 106, 108).

The data-brokerage service application 300 brokers the data exchange between IoT platforms based on information received from the IoT platforms about the data streams they provide or which they are interested in. Some or all of the information is stored in the marketplace repository 310, populating the repository 310 over time. Metadata about available data streams stored in the marketplace repository 310 may include, for example, identifying information of the respective data producer (e.g., network address and the name of the company or organization), a name and/or general description of the data stream (such as, e.g., "weather data"), the general type of data (e.g., whether it is time-series data acquired at a fixed data update rate or event data), a list of the data fields included in the data stream (including for each field, for example, a name of the quantity measured (e.g., temperature) and the corresponding units (e.g., degrees Fahrenheit or degrees Celsius)), data rates (e.g., one data sample per minute) or other availability information (including, e.g., indications of time periods during which data is unavailable or acquired at a reduced rate), locational information (e.g., descriptors of cities, countries, or geographic regions for which the data is acquired; or coordinates or addresses associated with the IoT device locations), and pricing information (e.g., a minimum or fixed price per amount of data or periodic subscription fee). The marketplace repository 310 may also store metadata about the data streams of interest to consumers, including identifying information of the respective data consumer (e.g., network address and the name of the company or organization), a list of the data fields of interest, indications of desired data rates, and pricing information (e.g., a maximum price the data consumer is willing to pay).

In some embodiments, the data-brokerage service application 300 generates user interfaces to present information to and/or solicit information from human platform users/operators. For example, a search interface may allow the user to search for data streams of interest (e.g., by entering search tokens for a free-form search or filling in a structured search form). The data-brokerage service application 300 can then run the user input against the marketplace repository 310 to identify data streams matching the data consumer's needs, and present the results to the user. Alternatively, the user may be given the opportunity to browse available data (e.g., using one or more drop-down menus that organize data streams by industry and/or data type). Data streams may also be recommended to data consumers based on consumer-profile information (such as the industry and/or geographic region the organization owning or operating the data-consumer platform operates in). In any case, suitable user-interface components may facilitate user selection of one or more data streams (or portions thereof). Upon receipt of such a selection, the data-brokerage service application 300 may communicate pricing and payment terms, SLA terms, and/or other contractual provisions to the data consumer, and optionally the data producer (e.g., in cases where the data producer allows for negotiation of terms with individual data consumers, as opposed to offering data under fixed terms), and solicit agreement to these terms. The SLAs agreed upon are stored in the SLA repository 312. In some embodiments, the operator of the data-brokerage service is itself a party to the contract, e.g., guaranteeing specified service levels and/or receiving a commission or fixed fee for facilitating the data exchange between data consumer and data producer. Once all parties have entered into the data-sharing contract, and optionally following verification of payment, the data-brokerage server 102 may trigger set-up of a (direct or indirect) P2P connection between the data producer and data consumer in accordance with a configuration determined by the agent configuration manager 306, e.g., by generating and transmitting security tokens and/or encryption keys as well as configuration information including network addresses for the P2P connections to the agent applications 112 on the respective IoT platforms.

During data exchange via the P2P connections, data-traffic information (such as, e.g., download and/or upload data rates and information about any packet losses or delays) is continuously sent from the IoT platforms to the SLA monitor 302 executing on the data-brokerage server 102. The SLA monitor 302 looks up the SLAs associated with the various connections to determine, from the reported data-traffic information, whether all SLA terms are met. If the SLA monitor 302 detects a violation of one or more terms of an SLA, it alerts the SLA manager 304. The SLA manager 304 accesses the agent and links configurations repository 314 to ascertain the current configuration of the IoT data-sharing network, particularly the P2P connection path over which the data stream subject to the SLA violation is sent. Based on the configuration, in conjunction with the data-traffic information, the SLA manager 304 identifies one or more IoT platforms that can be added to the connection path as relays to assist the data-producer IoT platform to meet its obligations under the SLA and cure the violation. In accordance with various embodiments, the SLA manager 304 performs a hierarchical search for IoT platforms with sufficient free capacity to serve as relays, beginning with IoT platforms already within the sub-network associated with the data stream to be relayed (as data consumers), continuing with the larger network if no suitable relay platform can be found within the sub-network, and finally moving on to computational platforms not presently engaged in data sharing via the network, but available for deployment as relays. Once the IoT platform(s) to be added to the peer network have been identified, they are communicated from the SLA manager 304 to the agent configuration manager 306. The agent configuration manager 306 updates the link configurations and agent configurations accordingly in the agent and link configurations repository 314, and further sends updated configuration information to the IoT platforms subject to the update, which include the data-producer IoT platform 104 (whose data stream is now re-directed to the added relay IoT platform 106), the data-consumer IoT platform 108 (which is configured to now receive the data stream from the added relay IoT platform), and the relay IoT platform 106 itself (which establishes a new P2P connection at least with the data-consumer IoT platform 108, and if not a data consumer of the data stream also with the data-producer IoT platform 104).

As will be appreciated by those of ordinary skill in the art, the organization of the overall functionality of the data-brokerage server 102 into various modules is by way of example only, and other ways of grouping the described functionality are possible.

Figure 4:
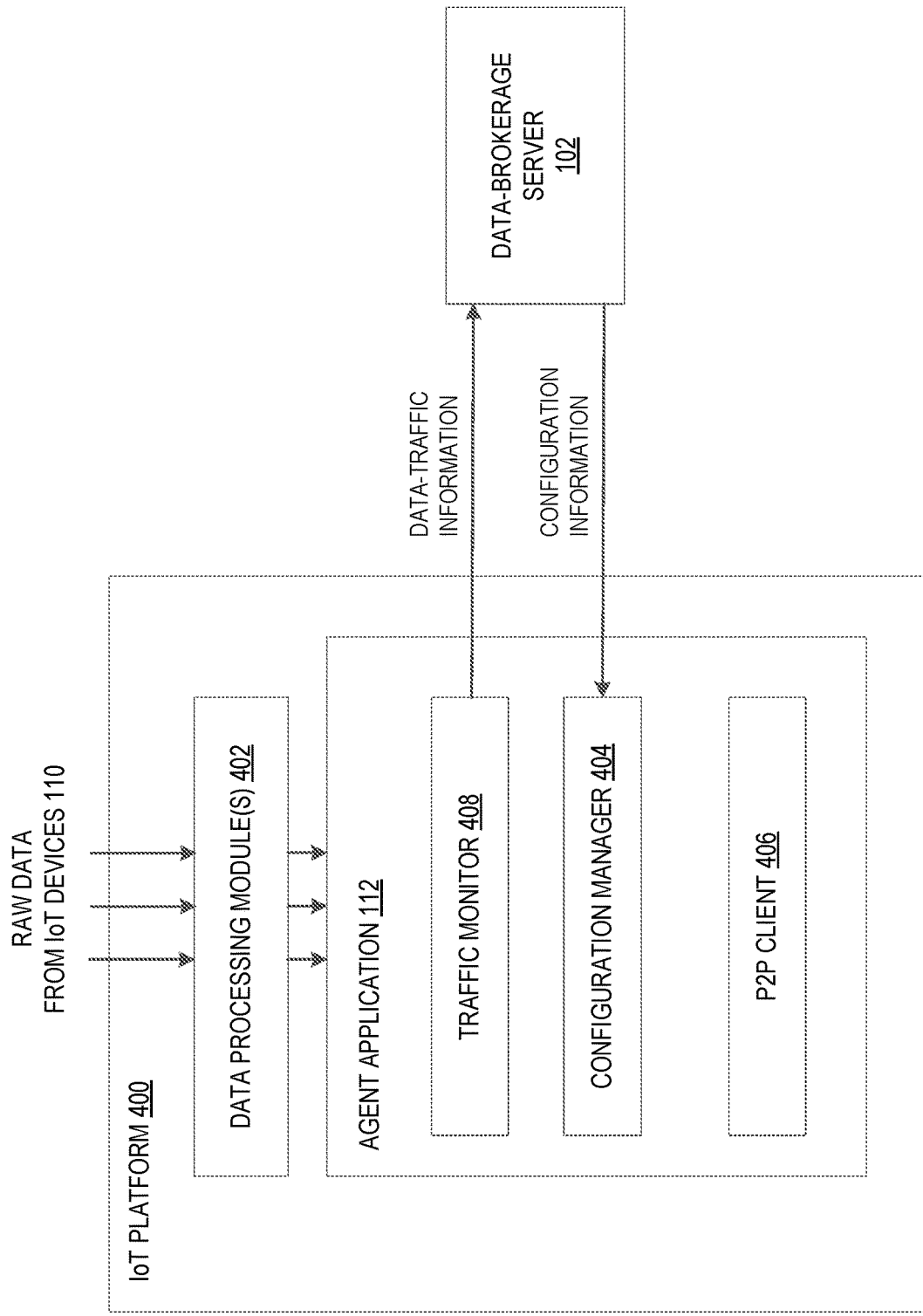
FIG. 4 is a block diagram of an IoT platform in accordance with an example embodiment.

Turning now to the data consumer, FIG. 4 is a block diagram of an IoT platform 400 (e.g., corresponding to any one of IoT platforms 104, 106, 108) in accordance with an example embodiment. The IoT platform 400, which may be implemented by one or more computers, includes one or more data-processing modules 402 for processing the raw data received from the IoT devices 110 connected to the IoT platform 400, and an agent application 112 facilitating data exchange with other IoT platforms via P2P connections as brokered by the data-brokerage service application 300. The data-processing module(s) 402 and agent application 112 may be implemented by one or more processors executing program code stored in memory. The IoT platform 400 may further include one or more data storage devices for temporarily or permanently storing raw and/or processed IoT data. To enable communications with the data-brokerage server 102 and other IoT platforms, the IoT platform 400 includes a network interface (or multiple such interfaces on multiple computers collectively constituting the IoT platform) (not shown).

The data-processing modules 402 may condition, filter, aggregate, average, and/or resample incoming raw data streams, e.g., to remove noise or outliers or otherwise improve the data quality. Furthermore, the data-processing modules 402 may analyze and process the data to derive new quantities of interest. Raw data and/or processed data may be passed on to the agent application 112 for streaming to other IoT platforms. Conversely, data streams received at the agent application 112 from other IoT platforms may be forwarded to the data-processing module(s) 402 for processing and analysis, or stored in permanent storage of the IoT platform 400 for future use. The IoT platform 400 may also expose an application programming interface (API) allowing third-party vendors to provide additional processing or analysis capabilities, e.g., via plug-ins.

The agent application 112 may include various sub-modules, including, e.g., a configuration manager 404, a P2P client 406, and a traffic monitor 408. The configuration manager 404 processes configuration information received from the data-brokerage server 102 to determine, e.g., which of its peer IoT platforms it is to connect to and which data streams are to be sent or received via these connections. The P2P client 406 establishes the P2P connections with the peer IoT platforms (e.g., using a secure handshake), streams raw and/or processed data acquired by the IoT platform 400 and receives data streams from other IoT platforms. In case of encrypted data exchange, the P2P platform also encrypts outgoing and decrypts incoming data streams (using the encryption keys provided by the data-brokerage server 102).

The traffic monitor 408 measures data traffic over the P2P connections established by the P2P client 406, and sends related data-traffic information to the data-brokerage server 102. If the data-brokerage server 102 updates the configuration information, e.g., to enforce SLA obligations of the IoT platform 400, such updates are implemented by the configuration manager 404. The agent application 112 may include further sub-modules (not shown) for preparing outgoing data streams for transmission, e.g., by removing personally identifiable information or other specified information that ought not be shared (e.g., for compliance with privacy laws or other regulations) or formatting data in accordance with a configuration received from the data-brokerage server, or for filtering, formatting, and/or aggregating incoming data streams.

Figure 5:
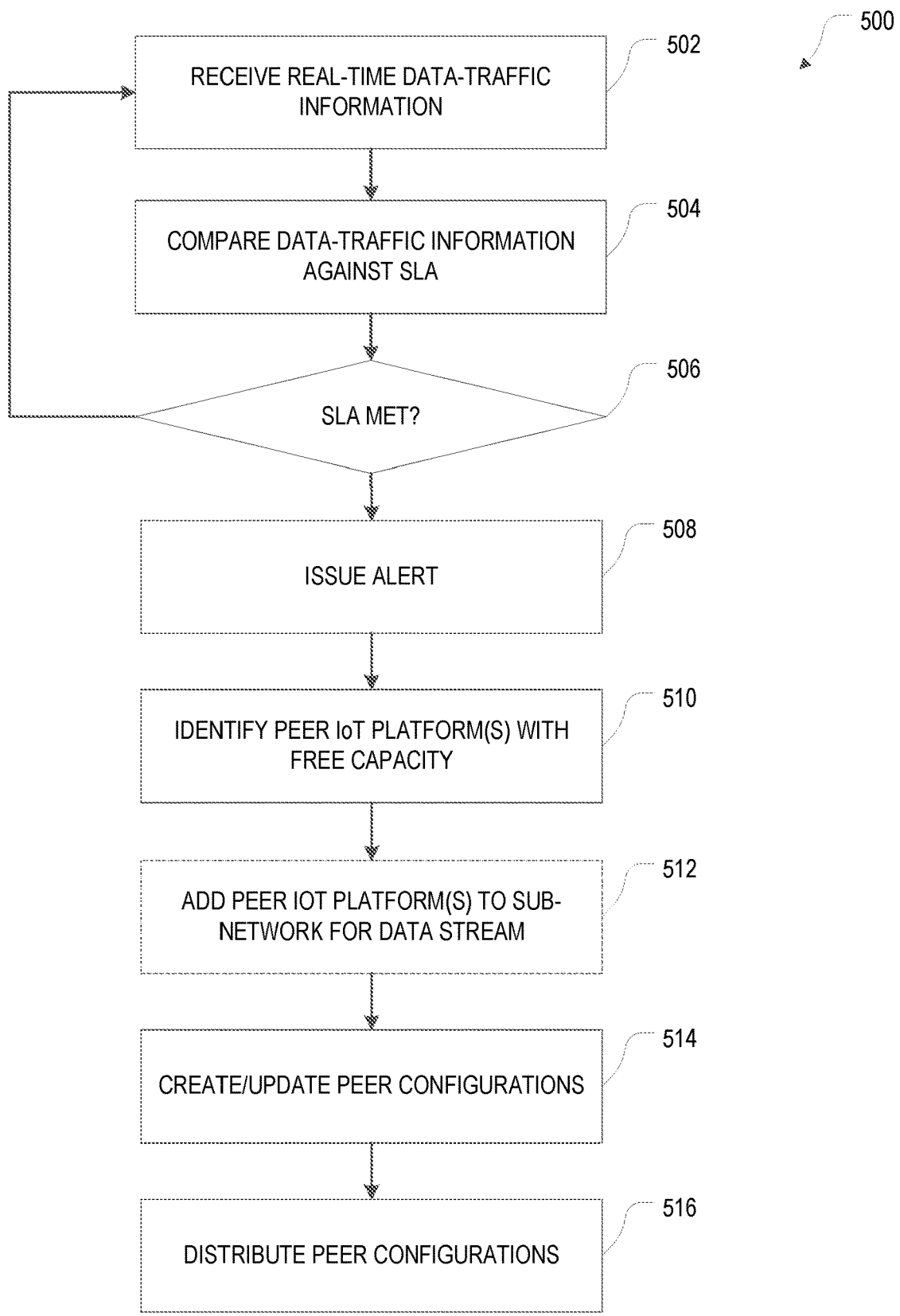
FIG. 5 is a flow chart of a method for enforcing SLA agreements in P2P networks, in accordance with various embodiments.

FIG. 5 is a flow chart of a method for enforcing SLA agreements in P2P networks, in accordance with various embodiments. The method 500, viewed from the perspective of the data-brokerage server 102, begins with the receipt of (usually real-time) data-traffic information from the IoT platforms within the data-sharing network (act 502). The data-traffic information for a given pair of data producer and data consumer is compared (repeatedly, as indicated by the loop) against the terms of an SLA between them (act 504), and if the SLA is violated in any of its terms (or a violation is immanent) (as determined in act 506), an alert is issued (act 508). To cure the violation, IoT platforms with free capacity to serve as relay IoT platforms within the P2P data-sharing network are identified (act 510). The relay IoT platform(s) may be selected from among the (other) data consumers of the data stream that is subject to the violation, or from the P2P network at large. Alternatively, e.g., if none of the connected IoT platforms has sufficient capacity to serve as a relay, one or more computing platforms not previously part of the P2P network may be newly deployed as "virtual nodes" (act 512). Once the relay platforms have been identified, the network configuration is updated accordingly, e.g., by modifying existing configurations for the data stream (to reroute the data stream) and/or creating new configurations for relay platforms that did not previously receive the data stream (act 514). The updated configuration information is then distributed to the data producer, data consumer, and relay platforms to alter the network configuration (act 516). Data traffic continues to be monitored, and if it is determined, at a later time, that the original configuration is again adequate to satisfy the SLA (e.g., because resources of the data producer have freed up), the reconfiguration of the network may be reversed such that the data flow reverts to the original data flow.

A system according to one example embodiment includes a server (including one or more processors) that is communicatively coupled to a plurality of computing platforms engaged in data exchange via peer-to-peer connections. The server is configured to perform operations including: receiving, from the plurality of computing platforms, data-traffic information about data traffic over the peer-to-peer connections; comparing the data-traffic information against service level agreements to determine whether the service level agreements are met; and, upon detection of a violation of a term of a service level agreement associated with a data-producer computing platform and a data-consumer computing platform, reconfiguring the peer-to-peer connections to cure the violation by routing a data stream from the data-producer computing platform to the data-consumer computing platform via at least one additional computing platform having free capacity. The server may include one or more data storage devices storing the service level agreements and configurations associated with the peer-to-peer connections. Reconfiguring the peer-to-peer connections may include updating the configurations and distributing updated configuration information to the data-producer computing platform, the data-consumer computing platform, and the at least one additional computing platform. The system may also include agent applications executing on the plurality of computing platforms, the agent applications configured to monitor data traffic over the peer-to-peer connections and, based on the monitoring, send the data-traffic information to the server. The agent applications may be further configured to establish the peer-to-peer connections and exchange data via the peer-to-peer connections in accordance with configuration information received from the server. In some cases, the operations performed by the server further include identifying one or more computing platforms having free capacity based on data-traffic information provided by the one or more computing platforms, and selecting the at least one additional computing platform from among the identified one or more computing platforms. Further, the operations may include providing one or more encryption keys to the data-consumer platform and the data-producer platform, and to the at least one additional computing platform only if it is itself a data consumer of the data stream. The system may also include one or more computing platforms available for deployment in response to the detection of the violation. The operations performed by the server may include restoring an original configuration of the peer-to-peer connections upon determining that the previously violated term of the service level agreement can again be met without routing the data stream via the at least one additional computing platform.

A method in accordance with one embodiment involves receiving at a server, from a plurality of computing platforms engaged in data exchange via peer-to-peer connections and communicatively coupled to the server, data-traffic information about data traffic over the peer-to-peer connections; comparing the data-traffic information against service level agreements to determine whether the service level agreements are met; and, upon detection of a violation of a term of a service level agreement associated with a data-producer computing platform and a data-consumer computing platform, reconfiguring the peer-to-peer connections to cure the detected violation by routing a data stream from the data-producer computing platform to the data-consumer computing platform via at least one additional computing platform having free capacity. The may further include identifying one or more computing platforms having free capacity based on data-traffic information provided by the one or more computing platform, and selecting the at least one additional computing platform from among the identified one or more computing platforms. The at least one additional computing platform may be selected from among one or more computing platforms that are themselves data consumers of the data stream; in this case, the at least one additional computing platform may be caused to receive a price discount for the data stream from the data-producing platform. Alternatively, the at least one additional computing platform may be a platform that is not itself a data consumer of the data stream; the method may further include providing one or more encryption keys to the data-consumer platform and the data-producer platform, but, in this case, not to the at least one additional computing platform. The at least one additional computing platform may be deployed deployed in response to the detection of the violation. Further, an original configuration of the peer-to-peer connections may be restored upon determining that the term of the service level agreement can be met without routing the data stream via the at least one additional computing platform. Reconfiguring the peer-to-peer connections may include distributing updated configuration information to the data-producer computing platform, the data-consumer computing platform, and the at least one additional computing platform.

In accordance with one embodiment, one or more tangible computer-readable media store instructions to control the operation of one or more processors, the instructions, when executed by the one or more processors, causing the one or more processors to perform operations comprising: receiving, from a plurality of computing platforms engaged in data exchange via peer-to-peer connections, data-traffic information about data traffic over the peer-to-peer connections; comparing the data-traffic information against service level agreements to determine whether the service level agreements are met; and, upon detection of a violation of a term of a service level agreement associated with a data-producer computing platform and a data-consumer computing platform, reconfiguring the peer-to-peer connections to cure the detected violation by routing a data stream from the data-producer computing platform to the data-consumer computing platform via at least one additional computing platform having free capacity. The one or more tangible computer-readable media may also store instructions for performing other operations describe above as part of a method or system according to embodiments, including, e.g., the operations of identifying one or more computing platforms having free capacity based on data-traffic information provided by the one or more computing platforms, and selecting the at least one additional computing platform from among the identified one or more computing platforms, and/or restoring an original configuration of the peer-to-peer connections upon determining that the term of the service level agreement can be met without routing the data stream via the at least one additional computing platform.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

FIG. 6 is a block diagram of a computer processing system 600 within which a set of instructions 624 may be executed for causing a computer to perform any one or more of the methodologies discussed herein. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment.

In addition to being sold or licensed via traditional channels, embodiments may also, for example, be deployed by software-as-a-service (SaaS), application service provider (ASP), or by utility computing providers. The computer may be a server computer, a personal computer (PC), a tablet PC, a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that, individually or jointly, execute a set (or multiple sets) of instructions to perform any one or more of the methodologies discussed herein.

The example computer processing system 600 includes a processor 602 (e.g., a central processing unit (CPU), a graphics processing unit (GPU), or both), a main memory 604, and a static memory 606, which communicate with each other via a bus 608. The computer processing system 600 may further include a video display 610 (e.g., a plasma display, a liquid crystal display (LCD), or a cathode ray tube (CRT)). The computer processing system 600 also includes an alphanumeric input device 612 (e.g., a keyboard), a user interface (UI) navigation (e.g., cursor control) device 614 (e.g., a mouse and/or touch screen), a drive unit 616, a signal generation device 618 (e.g., a speaker), and a network interface device 420.

The drive unit 616 includes a machine-readable medium 622 on which is stored one or more sets of instructions 624 and data structures embodying or utilized by any one or more of the methodologies or functions described herein. The instructions 624 may also reside, completely or at least partially, within the main memory 604, the static memory 606, and/or within the processor 602 during execution thereof by the computer processing system 600, the main memory 604, the static memory 606, and the processor 602 also constituting tangible machine-readable media 622.

The instructions 624 may further be transmitted or received over a network 626 via the network interface device 620 utilizing any one of a number of well-known transfer protocols (e.g., Hypertext Transfer Protocol).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions 624. The term "machine-readable medium" shall also be taken to include any medium that is capable of storing, encoding, or carrying a set of instructions 624 for execution by the computer and that cause the computer to perform any one or more of the methodologies of the present application, or that is capable of storing, encoding, or carrying data structures utilized by or associated with such a set of instructions 624. The term "machine-readable medium" shall accordingly be taken to include, but not be limited to, solid-state memories and optical and magnetic media.

While the embodiments of the invention(s) is (are) described with reference to various implementations and exploitations, it will be understood that these embodiments are illustrative and that the scope of the inventive subject matter is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the inventive subject matter.

What is claimed is:

1. A system comprising:
one or more processors; and
a machine-readable medium storing instructions that, when executed by the one or more processors, cause the one or more processors to perform operations comprising:
accessing data-traffic information about data traffic among a plurality of data-producer devices and data-consumer devices via peer-to-peer connections;
determining, based on the data-traffic information, that there is violation of a service level agreement that corresponds to a data stream available to a first data-consumer device from a first data-producer device; and
curing the violation of the service level agreement by causing a second data-consumer device with available capacity to relay the data stream, to which the second data-consumer device is not subscribed, from the first data-producer device to the first data-consumer device in exchange for provision of a price discount to the second data-consumer device for relaying the data stream to which the second data-consumer device is not subscribed.

2. The system of claim 1, wherein:
the curing of the violation of the service level agreement by the causing of the second-data consumer device to relay the data stream includes reconfiguring at least one of the peer-to-peer connections.

3. The system of claim 2, wherein:
the reconfiguring of the at least one of the peer-to-peer connections includes updating configuration data and providing the updated configuration data to at least one of the first data-producer device, the first data-consumer device, or the second data-consumer device.

4. The system of claim 1, wherein:
the determining that the service level agreement is violated includes comparing at least a portion of the data-traffic information to a term of the service level agreement.

5. The system of claim 1, wherein:
the accessing of the data-traffic information includes receiving the data-traffic information from at least a portion of the plurality of data-producer devices and data-consumer devices.

6. The system of claim 1, wherein the operations further comprise:
identifying the second data-consumer device by detecting the available capacity thereof based on the accessed data-traffic information about the data traffic among the plurality of data-producer devices and data-consumer devices via the peer-to-peer connections.

7. The system of claim 1, wherein the operations further comprise:
determining that the service-level agreement can be fulfilled without the second data-consumer device continuing to relay the data stream to the first data-consumer device; and
restoring a previous configuration of the peer-to-peer connections among the plurality of data-producer devices and data-consumer devices, the restored previous configuration causing the first data-producer device to provide the data stream to the first data-consumer device without the second data-consumer device relaying the data stream.

8. A method comprising:
accessing, by one or more processors, data-traffic information about data traffic among a plurality of data-producer devices and data-consumer devices via peer-to-peer connections;
determining, by the one or more processors and based on the data-traffic information, that there is violation of a service level agreement that corresponds to a data stream available to a first data-consumer device from a first data-producer device; and
curing, by the one or more processors, the violation of the service level agreement by causing a second data-consumer device with available capacity to relay the data stream, to which the second data-consumer device is not subscribed, from the first data-producer device to the first data-consumer device in exchange for provision of a price discount to the second data-consumer device for relaying the data stream to which the second data-consumer device is not subscribed.

9. The method of claim 8, wherein:
the curing of the violation of the service level agreement by the causing of the second-data consumer device to relay the data stream includes reconfiguring at least one of the peer-to-peer connections.

10. The method of claim 9, wherein:
the reconfiguring of the at least one of the peer-to-peer connections includes updating configuration data and providing the updated configuration data to at least one of the first data-producer device, the first data-consumer device, or the second data-consumer device.

11. The method of claim 8, wherein:
the determining that the service level agreement is violated includes comparing at least a portion of the data-traffic information to a term of the service level agreement.

12. The method of claim 8, wherein:
the accessing of the data-traffic information includes receiving the data-traffic information from at least a portion of the plurality of data-producer devices and data-consumer devices.

13. The method of claim 8, further comprising:
identifying the second data-consumer device by detecting the available capacity thereof based on the accessed data-traffic information about the data traffic among the plurality of data-producer devices and data-consumer devices via the peer-to-peer connections.

14. The method of claim 8, further comprising:
determining that the service-level agreement can be fulfilled without the second data-consumer device continuing to relay the data stream to the first data-consumer device; and
restoring a previous configuration of the peer-to-peer connections among the plurality of data-producer devices and data-consumer devices, the restored previous configuration causing the first data-producer device to provide the data stream to the first data-consumer device without the second data-consumer device relaying the data stream.

15. A non-transitory machine-readable medium storing instructions that, when executed by one or more processors of a machine, cause the machine to perform operations comprising:
accessing data-traffic information about data traffic among a plurality of data-producer devices and data-consumer devices via peer-to-peer connections;
determining, based on the data-traffic information, that there is violation of a service level agreement that corresponds to a data stream available to a first data-consumer device from a first data-producer device; and
curing the violation of the service level agreement by causing a second data-consumer device with available capacity to relay the data stream, to which the second data-consumer device is not subscribed, from the first data-producer device to the first data-consumer device in exchange for provision of a price discount to the second data-consumer device for relaying the data stream to which the second data-consumer device is not subscribed.

16. The non-transitory machine-readable medium of claim 15, wherein:
the curing of the violation of the service level agreement by the causing of the second-data consumer device to relay the data stream includes reconfiguring at least one of the peer-to-peer connections.

17. The non-transitory machine-readable medium of claim 15, wherein:
the determining that the service level agreement is violated includes comparing at least a portion of the data-traffic information to a term of the service level agreement.

18. The non-transitory machine-readable medium of claim 15, wherein:
the accessing of the data-traffic information includes receiving the data-traffic information from at least a portion of the plurality of data-producer devices and data-consumer devices.

19. The non-transitory machine-readable medium of claim 15, wherein the operations further comprise:
identifying the second data-consumer device by detecting the available capacity thereof based on the accessed data-traffic information about the data traffic among the plurality of data-producer devices and data-consumer devices via the peer-to-peer connections.

20. The non-transitory machine-readable medium of claim 15, wherein the operations further comprise:

determining that the service-level agreement can be fulfilled without the second data-consumer device continuing to relay the data stream to the first data-consumer device; and restoring a previous configuration of the peer-to-peer connections among the plurality of data-producer devices and data-consumer devices, the restored previous configuration causing the first data-producer device to provide the data stream to the first data-consumer device without the second data-consumer device relaying the data stream.

* * * * *